United States Patent [19]

Lo

[11] Patent Number: 5,066,470

[45] Date of Patent: Nov. 19, 1991

[54] CYCLIC PROCESS FOR THE REMOVAL OF SULFUR DIOXIDE AND THE RECOVERY OF SULFUR FROM GASES

[76] Inventor: Ching-Lung Lo, R.D. 1/Box 51, Indian Hill La., Palisades, N.Y. 10964

[21] Appl. No.: 550,319

[22] Filed: Jul. 9, 1990

[51] Int. Cl.$^5$ ............... C01G 1/00; C01B 17/00; C01F 7/74

[52] U.S. Cl. ........................... 423/242; 423/153; 423/566; 423/567 A; 423/571

[58] Field of Search ............ 423/573.1, 574 R, 541 R, 423/567 A, 153, 571, 566.3, 242, 242 A, 242 R; 23/293 S

[56] References Cited

U.S. PATENT DOCUMENTS

| | | | |
|---|---|---|---|
| 2,021,936 | 11/1935 | Johnstone | 23/167 |
| 3,632,306 | 1/1972 | Fisher et al. | 23/2 |
| 3,848,058 | 11/1974 | Poncet et al. | 423/242 |
| 3,864,223 | 2/1975 | Colwell | 423/571 |
| 4,078,048 | 3/1978 | Naokarni | 423/571 |

FOREIGN PATENT DOCUMENTS

| | | | |
|---|---|---|---|
| 2714217 | 11/1977 | Fed. Rep. of Germany | 423/242 R |
| 49-32867 | 3/1974 | Japan | 423/242 R |
| 53-31587 | 3/1978 | Japan | 423/242 R |

*Primary Examiner*—Gary P. Straub
*Assistant Examiner*—Timothy C. Vanoy
*Attorney, Agent, or Firm*—Kenyon & Kenyon

[57] ABSTRACT

In accordance with the invention, gases containing sulfur dioxide are passed through a solution rich in ferric iron and containing barium chloride or calcium chloride. Sulfur dioxide is oxidized by the ferric ion to sulfur trioxide when then forms sulfuric acid in the water. The sulfuric acid reacts with the barium ion to form barium sulfate, while the ferric ion is reduced to the ferrous state. The barium sulfate is separated from the mother liquor by filtration and is then reduced to barium sulfide with a carbonaceous material or any reducing gas. Then, the barium sulfide is reacted with another portion of solution rich in ferric iron to form elemental sulfur, while the barium ion or calcium ion combines with the chloride ion to regenerate barium chloride or calcium chloride as the case may be. The resulting solution, after the sulfur has been removed, is now rich in ferrous iron. This ferrous solution is combined with the solution from which the barium sulfate has been removed and is subjected to oxidation with oxygen, air, or other oxidizing gases. A portion of the oxidized solution, now rich in ferric iron, is recycled to be in contact with the sulfur dioxide-containing gas and another portion is used to react with the barium sulfide. In such a sequence of operations, a processing cycle is completed. Practically all of the sulfur dioxide in a flue gas can be removed using this process.

21 Claims, No Drawings

CYCLIC PROCESS FOR THE REMOVAL OF SULFUR DIOXIDE AND THE RECOVERY OF SULFUR FROM GASES

BACKGROUND OF THE INVENTION

1. Field of the Invention

This invention relates to a cyclic process for the removal of sulfur dioxide from industrial gases and other waste gases, such as flue gases from the burning of fossil fuels, smelter gases, spent gas from sulfuric acid manufacture, etc. . . . The invention further relates to a process of the above-described type wherein the sulfur dioxide is converted to form elemental sulfur in the processing cycle.

2. Description of Related Art

The generation of industrial gases and other waste gases is a long-standing environmental problem. Such gases, particularly flue gases, often contain sulfur dioxide. Sulfur dioxide is also liberated into the atmosphere by the burning of fossil fuels and from the smelting of sulfide ores. Other major sources of sulfur dioxide pollution include: combustion of sulfur-burning fuel, sulfuric acid manufacture, sludge acid purification, sulfur recovery from plants and pulp and paper manufacture. It has long been known that sulfur dioxide in the atmosphere is responsible for acid rain which is harmful to aquatic life, crops, forest land and other vegetation. Other deleterious effects of acid rain include discoloration and deterioration of limestone, marble and roofing slate, and respiratory infections and heart disease.

Accordingly, attempts have been made to reduce the content of sulfur dioxide in industrial gases. For example, the sulfur dioxide content of combustion emissions has been controlled to some extent through the use of low-sulfur fuels. However, such attempts have not been successful in eliminating the sulfur dioxide. Moreover, the use of sulfur fuels is often preferred or unavoidable and the use of low-sulfur fuels only affects a single source of sulfur dioxide generation (i.e., fuel combustion). The sulfur dioxide liberated from other industrial sources, described above, cannot be controlled in this manner. Thus, other methods have been developed for the control of gaseous emissions. Such methods include absorption, adsorption, condensation and chemical reaction.

In the absorption area packed columns or towers are generally used. Acidic gases such as $SO_2$ can be absorbed using a scrub liquor such as an alkaline ammonium salt solution or an organic liquid such as dialkylaniline or diethanlolamine. One major disadvantage of such methods is that the recovered gaseous pollutants may present a disposal problem. For example, a pollutant may be precipitated in an insoluble sludge which is difficult to handle. Other drawbacks to such methods include organic compound oxidation, fire and the necessity to control scrub liquor volatility to prevent vapor loss to the atmosphere.

In the chemical reaction area, U.S. Pat. No. 3,632,306 discloses a process for the removal of sulfur dioxide from a flue gas. The flue gas is scrubbed with an aqueous slurry containing one of calcium oxide, calcium carbonate, magnesium oxide, magnesium carbonate, barium oxide or barium carbonate. A solid sulfite is precipitated and must be disposed of. No elemental sulfur is generated by the process. Other processes have been developed which result in the oxidation of $SO_2$ to sulfuric acid. In U.S. Pat. No. 2,021,936 a flue gas is washed with a solution containing ferric ions and manganese ions. In U.S. Pat. No. 3,848,058 waste gas is contacted with an aqueous solution of ferric sulfate to form sulfuric acid.

It is an object of the present invention to provide a cyclic process for removal of practically all of the sulfur dioxide from a waste gas using a solution which is regenerated in the process.

It is a further object of the invention to provide a process of the previously mentioned type wherein elemental sulfur is formed and recovered as a product.

It is a further object of the invention to provide a process of the previously mentioned type which is economical and wherein there is no formation of waste products which present a waste disposal problem.

It is yet a further object of the invention to provide a process of the previously mentioned type wherein most of the process steps can take place at low temperatures.

SUMMARY OF THE INVENTION

In accordance with the invention, gases containing sulfur dioxide are passed through a solution rich in ferric iron and containing barium chloride or calcium chloride. Sulfur dioxide is oxidized by the ferric iron to sulfur trioxide which then forms sulfuric acid in the water. The sulfuric acid reacts with the barium (or calcium) ion to form a very insoluble barium (or calcium) sulfate, while the ferric ion is reduced to the ferrous state. The barium (or calcium) sulfate is separated from the mother liquor by filtration and is then reduced to barium (or calcium) sulfide with a carbonaceous material or any reducing gas. Next, the barium (or calcium) sulfide is reacted with another portion of solution rich in ferric iron to form elemental sulfur, while the barium ion or calcium ion combines with the chloride ion to regenerate barium chloride or calcium chloride as the case may be. The resulting solution, after the sulfur has been removed is now rich in ferrous iron. This ferrous solution is combined with the solution from which the barium (or calcium) sulfate has been removed and is subjected to oxidation with oxygen, air, or other oxidizing gases. A portion of the oxidized solution, now rich in ferric iron, is recycled to be in contact with the sulfur dioxide-containing gas and another portion is used to react with the barium (or calcium) sulfide. In such a sequence of operations, a processing cycle is completed. Practically all of the sulfur dioxide in a flue gas can be removed using this process.

DETAILED DESCRIPTION OF THE INVENTION

The process of the preferred embodiment of the invention can be represented by the following reactions which use preferred reagents:

(1) $SO_2 + 2FeCl_3 + 2H_2O = 2FeCl_2 + 2HCl + H_2SO_4$ (2) $BaCl_2 + H_2SO_4 = BaSO_4 + 2HCl$ (3) $BaSO_4 + 2C = BaS + 2CO_2$ (4) $BaS + 2FeCl_3 = BaCl_2 + 2FeCl_2 + S$ (5) $4FeCl_2 + 4HCl + O_2 = 4FeCl_3 + 2H_2O$

An aqueous solution of $FeCl_3$ preferably serves as the source of ferric iron for the reaction with $SO_2$ in reaction (1). Typically, the $SO_2$ concentration in flue gases ranges from about 0.01 percent to about 1 percent.

$BaCl_2$ is added to the aqueous solution of $FeCl_3$ $CaCl_2$ can also be used, however, $BaCl_2$ is preferred over $CaCl_2$ because barium sulfate, which forms as a precipitate in the process, is much more insoluble than calcium sulfate which would be formed if $CaCl_2$ were used. The temperature of the solution of $FeCl_3$ and $BaCl_2$ is preferably elevated to a temperature between 100° F. and 200° F. and most preferably to about 160° F. for reactions (1) and (2) to occur.

A flue gas containing, for example, $CO_2$, $N_2$ and $SO_2$ etc. . . . is introduced into the solution of $FeCl_3$ and $BaCl_2$. For this purpose any conventional apparatus known in the art for contacting a gas with a liquid can be used. For example, any conventional spray tower commonly used in absorption techniques for air pollution control can be used. See Kirk-Othmer, *Encyclopedia of Chemical Technology*, Vol. 1, p. 656 (1978). In this technique, $FeCl_3$/$BaCl_2$ solution would be sprayed into a column through which a stream of flue gas is passed. The column would include a gas inlet and a gas outlet and a drain for drainage of the sprayed solution.

Alternatively, the flue gas may be bubbled through a column of the solution. The $SO_2$-free gas will emanate from the top of the column.

As the $SO_2$-containing gas is contacted with the $FeCl_3$/$BaCl_2$ solution, reactions (1) and (2) take place. In the process, $SO_2$ is oxidized by the ferric iron to sulfur trioxide which then forms $H_2SO_4$ in the water. In the reaction, the ferric ion is reduced to the ferrous state and HCl is produced. The sulfuric acid then reacts with the barium ion from the dissolved $BaCl_2$ to form barium sulfate precipitate which is very insoluble. As previously stated, $BaCl_2$ is preferred over $CaCl_2$ in the process of the invention because the calcium sulfate which would be formed in reaction (2) is hundreds of times more soluble than barium sulfate.

The precipitated $BaSO_4$ is filtered from the $FeCl_3$/$BaCl_2$ solution. If the process is conducted by bubbling flue gas through a column of solution the step of filtration can be conducted periodically or continuously. If conducted periodically, the step of filtration is preferably conducted when the $FeCl_3$/$BaCl_2$ solution needs to be regenerated. The solution will need to be regenerated when substantially all of the ferric ion has been expended and reduced to the ferrous state. Alternatively, slurry can be withdrawn continuously and filtered while regenerated solution is fed into the column to maintain the level of liquid.

If the process is conducted in a spray tower wherein $FeCl_3$/$BaCl_2$ solution is continuously sprayed into the tower and drained from the tower, the process need not be interrupted to filter the $BaSO_4$ from solution and regenerate the solution. In this embodiment, solution which is continuously drained from the spray tower can be continuously filtered, regenerated (in the manner which is described hereinafter) and recycled to the spray tower.

In accordance with the invention, the $BaSO_4$ may be used to produce elemental sulfur and in the process regenerate $BaCl_2$. To accomplish this, first the $BaSO_4$ precipitate which is filtered from the solution is reduced to BaS. This is preferably accomplished with a carbonaceous material (preferably coke) as illustrated in reaction (3) or a reducing gas. Where coke is used, the ratio of $BaSO_4$ to coke is preferably about 5:1. The reaction is carried out at high temperatures on the order of about 1400° F. to about 1800° F. for a period of about 3 hours. $CO_2$ is generated during the course of the reaction when carbon is used.

The BaS is added to an aqueous solution of ferric iron to carry out reaction (4) above. The source of ferric iron is preferably $FeCl_3$. Stirring greatly facilitates the reaction. The reaction is preferably conducted at a temperature in the range of 150° F. to 215° F. and most preferably at 180° F. At temperatures over 235° F. some form of sulfur (Rhombic) can melt and tend to coat the surface of the BaS particles thereby preventing them from being reacted with the ferric chloride. The reaction yields $BaCl_2$, $FeCl_2$ and sulfur. The sulfur is removed from the solution as a product and the solution is regenerated in the manner which is described hereinafter.

It can be seen that ferric ions are used to oxidize $SO_2$ in reaction (1) and to generate sulfur in reaction (4). In both reactions, $Fe^{+3}$ is expended and reduced to $Fe^{+2}$. In accordance with the invention, $Fe^{+3}$ is replenished by oxidation. The filtrate from reactions (1) and (2) and the filtrate from reaction (4) will contain $BaCl_2$, $FeCl_2$, $FeCl_3$ and HCl. The combined filtrates are preferably heated to about 200° F. and are contacted with an oxidizing agent, preferably oxygen, to convert $FeCl_2$ to $FeCl_3$ and expend HCl in the process. At temperatures below 150° F. oxidation would take an unnecessarily long amount of time in the absence of a catalyst. Any conventional apparatus known in the art for contacting a gas with a liquid can be used. Preferably, oxygen is bubbled through a column of the solution.

A typical solution consisting of the filtrates from reactions (1) and (2) and the filtrate from reaction (4) will contain a low concentration of $Fe^{+3}$, a high concentration of $Fe^{+2}$, $BaCl_2$ and HCl. When oxygen is bubbled into such a solution the concentration of $Fe^{+3}$ will increase as the concentration of $Fe^{+2}$ decreases. This resulting solution can be recycled for use in reactions (1) and (2) and reaction (4). The process can be described as cyclic because the HCl which is generated by reactions (1) and (2) is used to convert $FeCl_2$ to $FeCl_3$ and because $BaCl_2$ is regenerated in reaction (4).

As previously stated, the process may be conducted continuously. In one example of a continuous process, an aqueous solution of $FeCl_3$ and $BaCl_2$ is sprayed into a spray tower having a drain. A flue gas is continuously passed through the spray tower wherein reactions (1) and (2) occur to remove the $SO_2$ from the gas. Solution is continuously drained from the tower and is circulated to a filter. The barium sulfate in the drained solution is filtered out. Optionally, the $BaSO_4$ is passed to a separate reaction chamber to reduce it to BaS, for example, by reaction (3). If this option is exercised, it is followed by reaction (4) to generate sulfur and regenerate $BaCl_2$. If it is opted to not conduct reactions (3) and (4), the filtrate from reactions (1) and (2) (which contains HCl, $FeCl_2$, $FeCl_3$ and $H_2O$) is then treated with an oxidizing agent as in reaction (5) to replenish the $FeCl_3$ and $BaCl_2$ is added to the filtrate to replenish that which had been expended in reactions (1) and (2). The $BaCl_2$ may be from an original source. On the other hand, if it was opted to conduct reactions (3) and (4) $BaCl_2$ is regenerated by reaction (4) which takes place in a separate reaction chamber. Once the sulfur is filtered from the solution of reaction (4) the filtrate (which contains $BaCl_2$, $FeCl_2$ and $FeCl_3$) is combined with the filtrate from reactions (1) and (2) and the combined solution is treated with an oxidizing agent as in reaction (5) to replenish the $FeCl_3$. Since the combined solutions already contain $BaCl_2$ no additional $BaCl_2$ need be added. The replenished solution is then recycled back to the spray tower for treatment of the flue gas. If reactions (3) and (4) were conducted a portion of the replenished $FeCl_3$ solution is also recycled back to the vessel where reaction (4) occurs to convert BaS to $BaCl_2$ and S.

In another continuous process, an aqueous solution of FeCl$_3$ and BaCl$_2$ is loaded into a column. Flue gas is continuously passed through the column to remove SO$_2$. Solution is periodically or continuously drained from the Column, the BaSO$_4$ is filtered out and the solution is subjected to reaction (5). BaCl$_2$ is then added to the solution which is then ready to be recycled back into the column for treating the flue gas. If it was opted to generate sulfur, the filtrate from reaction (4) is combined with the filtrate from reactions (1) and (2) before reaction (5) is carried out. In this case, as previously explained, BaCl$_2$ need not be replenished and a portion of the regenerated FeCl$_3$ solution is recycled back to the column. Another portion of the regenerated FeCl$_3$ solution is recycled back to the vessel where reaction (4) takes place.

As mentioned previously, one advantage of the process of the present invention is that the equipment used in this process may be conventional columns. Furthermore, the equipment may be of moderate dimensions. This is due to the high reaction rate of barium sulfate precipitation. As previously described, as in a diffusion process, before the sulfur dioxide can react with the barium ion, it must first diffuse through a gas film, then through a liquid film of ferric iron solution to form sulfur trioxide, which forms sulfuric acid in the water, which then reacts with barium ion to form barium sulfate which is removed. Those are all of the obstacles involved in the SO$_2$ removal step of the process. These two films do not offer much resistance at all, especially when the solution is agitated. On the other hand, in the ordinary scrubbing operation of the prior art where slurries of fine limestone or other alkaline earth materials are used, the sulfur dioxide must go through a gas film, a liquid, and also a solid film. It is the last film that offers the most resistance because of a reaction involving less active reactants than those involved in the process of the present invention. This is why much larger-sized equipment—such as scrubbers for handling a large volume of recycling slurries—is required in the prior art processes using limestone or its equivalent.

Another advantage of the present invention is that all steps except for the conversion of BaSO$_4$ can be conducted at relatively low temperatures. The heat in the flue gas can provide the needed heat energy. Therefore, power consumption is minimal and the process is economical. Minimal power consumption is also attributable to the fact that only a small volume of solution is required for reaction and/or recycling in the present invention. The only step in this invention that requires high temperatures is the reduction of barium sulfate to barium sulfide—a temperature in the range of 1600° to 1800° F. is necessary.

In the foregoing specification, the invention has been described with reference to specific exemplary embodiments thereof. It will, however, be evident that various modifications and changes may be made thereunto without departing from the broader spirit and scope of the invention as set forth in the appended claims. The specification is accordingly to be regarded in an illustrative rather than a restrictive sense. The following examples are given to illustrate the individual reactions involved in this invention, but in no way to limit it to reagents, properties or conditions described therein.

EXAMPLE 1

Precipitation of BaSO$_4$

A one liter solution containing 60 g/l of Fe$^{+3}$, 20 g/l of Fe$^{+2}$ of iron chlorides and 120 g/l of BaCl$_2$ is placed in a 3-neck flask provided with a stirrer. The solution is heated with an electric mantle to a temperature of 160° F. A mixed gas stream composed of 15 parts of CO$_2$, 85 parts of N$_2$ and 0.2 parts of SO$_2$ is introduced below the stirrer at the bottom of the flask. Gas flow rate is adjusted to be 20 cu. ft. per hour. After 6 hours, the BaSO$_4$ suspended solution is filtered. The mother liquor is found to contain 26 g/l of Fe$^{+3}$ and 54 g/l of Fe$^{+2}$. The dry BaSO$_4$ weighs 70.8 grams.

EXAMPLE 2

Reduction of BaSO$_4$ 100 grams of precipitated BaSO$_4$ is mixed with 20 grams of finely ground ($-200$ mesh) coke and the mixture is placed in a steel container. Then, 5 grams of coke is spread evenly on top of the mix for protection. The container is covered with a steel lid, tightly fitted but still loose enough to allow the reaction gases to escape. After 3 hours in a Muffle furnace at 1800° F., the container is taken out of the furnace and is immediately transferred to a box filled with nitrogen gas for cooling. The total product obtained weighs 82 grams. Analysis shows that it consists of 71 g. of BaS and 11 g. of unreacted carbon inerts.

EXAMPLE 3

Sulfur Recovery 50 g. of the reduced product as obtained in Example 2 is added gradually to one liter of a vigorously stirred iron chloride solution containing 60 g/l of Fe$^{+3}$ and 20 g/l of Fe$^{+2}$. The solution is heated to a temperature of 180° F. After the addition is finished, stirring is maintained for half an hour at the same temperature to ensure that reaction is completed. The slurry is then filtered and the residue is subjected to low temperature drying. Analysis shows that the mother liquor contains 31 g/l of Fe$^{+3}$ and 49 g/l of Fe$^{+2}$. The dry residue weighs 15 g. and analyzed 54.5% S. When 10 g. of the residue is extracted with carbon disulfide, the extract after evaporation to dryness yields 5.1 g. of sulfur.

EXAMPLE 4

Oxidation of FeCl$_2$

A one liter chloride solution is prepared to contain 26 g/l of Fe$^{+3}$, 54 g/l of Fe$^{+2}$ with 120 g/l BaCl$_2$ and 20 g/l of HCl. It represents the typical composition of a resultant solution by mixing the solution from the precipitation of BaSO$_4$ step and the solution from the sulfur recovery step. The solution is charged to a 3-neck flask provided with a stirrer and heated to 200° F. Oxygen at 2 cu. ft. per hour is introduced under the stirrer at the bottom of the flask. Liquid samples for analysis are pipetted out at intervals to determine the degree of oxidation. After 3 hours, the operation is terminated. Analysis shows that the solution contains 57 g/l of Fe$^{+3}$ and 23 g/l of Fe$^{+2}$.

What is claimed is:

1. A process for the removal of sulfur dioxide from a gas containing sulfur dioxide comprising the steps of: contacting a gas containing sulfur dioxide with an aqueous solution comprising water, ferric chloride and a salt selected from the group consisting of barium chloride and calcium chloride to form ferrous chloride, hydrochloric acid and a precipitate selected from the group consisting of barium sulfate and calcium sulfate; and treating said aqueous solution with an oxidizing agent to convert ferrous chloride to ferric chloride.

2. The process according to claim 1 wherein said oxidizing agent is oxygen and wherein water is formed in the conversion of ferrous chloride to ferric chloride.

3. The process according to claim 1 wherein the salt is barium chloride and the precipitate is barium sulfate.

4. The process according to claim 3 further comprising the step of removing precipitated barium sulfate from the aqueous solution.

5. The process according to claim 4 further comprising the steps of: reducing barium sulfate which has been removed from the aqueous solution to barium sulfide; reacting the formed barium sulfide with ferric chloride to form barium chloride, ferrous chloride and sulfur; separating the sulfur from the barium chloride and ferrous chloride; and recycling the barium chloride and ferrous chloride separated from the sulfur into the aqueous solution.

6. The process according to claim 5 wherein barium sulfate is reacted with carbon to yield barium sulfide.

7. The process according to claim 1 wherein the salt is calcium chloride and the precipitate is calcium sulfate, further comprising the steps of: removing precipitated calcium sulfate from the aqueous solution; reducing calcium sulfate which has been removed from the aqueous solution to calcium sulfide; reacting the formed calcium sulfide with ferric chloride to form calcium chloride, ferrous chloride and sulfur; separating the sulfur from the calcium chloride and ferrous chloride; and recycling the calcium chloride and ferrous chloride separated from the sulfur into the aqueous solution.

8. A process for the removal of sulfur dioxide and the recovery of sulfur from a waste gas containing sulfur dioxide comprising the steps of: feeding a waste gas containing sulfur dioxide into a first aqueous solution comprising water, ferric chloride and barium chloride to form ferrous chloride, hydrochloric acid and barium sulfate precipitate; removing barium sulfate precipitate from said first solution; reducing barium sulfate precipitate removed from said first solution with a reducing agent to form barium sulfide; reacting formed barium sulfide in a second aqueous solution comprising water and ferric chloride to form barium chloride, ferrous chloride and sulfur; removing the sulfur from the second aqueous solution; combining the second aqueous solution from which sulfur has been removed with the first aqueous solution and treating the combined first aqueous solution and second aqueous solution with an oxidizing agent to convert ferrous chloride to ferric chloride.

9. The process according to claim 8 wherein the oxidizing agent is oxygen and wherein water is formed in the conversion of ferrous chloride to ferric chloride.

10. The process according to claim 9 wherein the reducing agent used in the step of forming barium sulfide is carbon.

11. The process according to claim 10 further comprising the step of feeding a waste gas containing sulfur dioxide into the combined first aqueous solution and second aqueous solution.

12. The process according to claim 8 further comprising the steps of: apportioning the combined first aqueous solution and second aqueous solution wherein ferrous chloride has been converted to ferric chloride into a first portion and a second portion; feeding a waste gas containing sulfur dioxide into the first portion; and reacting the second portion with barium sulfide formed in a prior step of the process to form barium chloride, ferrous chloride and sulfur.

13. The process according to claim 8 wherein the first aqueous solution is maintained at a temperature of about 100° F. to about 200° F. during the step of feeding a waste gas through it.

14. The process according to claim 10 wherein the step of reacting the barium sulfate precipitate with carbon is conducted at a temperature of about 1400° F. to about 1800° F. and wherein the step of reacting barium sulfide with the second aqueous solution is conducted at a solution temperature of about 150° F. to about 215° F.

15. The process according to claim 14 wherein the step of converting ferrous chloride to ferric chloride is conducted at a combined solution temperature of at least about 200° F.

16. The process according to claim 8 wherein the ratio of barium chloride to ferric ions in the first aqueous solution is initially from about 1.5:1 to about 2.5:1.

17. The process according to claim 16 wherein the initial concentration of ferric ions in the first solution is about 60 g/l and the initial concentration of barium chloride in the first solution is about 120 g/l.

18. The process according to claim 16 wherein the process is continuous and wherein said ratio is maintained.

19. The process according to claim 17 wherein the process is discontinuous and wherein the step of combining the first aqueous solution with the second aqueous solution and the step of treating the combined solution with an oxidizing agent to convert ferrous chloride to ferric chloride only occur after the concentration of ferric ions in the first aqueous solution is about 25 g/l or less.

20. The process according to claim 8 wherein the step of feeding a waste gas into the first aqueous solution is conducted in a vessel and wherein the combined first and second solution in which ferrous chloride has been converted to ferric chloride is recycled into said vessel.

21. The process according to claim 1 wherein in the step of treating said aqueous solution with an oxidizing agent the ferrous chloride is reacted with hydrochloric acid generated from the step of contacting a gas.

* * * * *